United States Patent
Dibbad et al.

(10) Patent No.: US 10,551,900 B2
(45) Date of Patent: Feb. 4, 2020

(54) VOLTAGE REGULATOR EFFICIENCY-AWARE SYSTEM ENERGY MANAGEMENT

(71) Applicant: Intel Corporation, Santa Clara, CA (US)

(72) Inventors: Vijayakumar A. Dibbad, Bangalore (IN); Satish Prathaban, Bangalore (IN); Harinarayanan Seshadri, Bangalore (IN); Rajeev D. Muralidhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/471,606

(22) Filed: Mar. 28, 2017

(65) Prior Publication Data

US 2018/0284863 A1    Oct. 4, 2018

(51) Int. Cl.
*G06F 1/324* (2019.01)
*G06F 1/3228* (2019.01)
*G06F 1/329* (2019.01)

(52) U.S. Cl.
CPC .............. *G06F 1/324* (2013.01); *G06F 1/329* (2013.01); *G06F 1/3228* (2013.01)

(58) Field of Classification Search
None
See application file for complete search history.

(56) References Cited

U.S. PATENT DOCUMENTS

| | | | | |
|---|---|---|---|---|
| 5,013,995 A * | 5/1991 | Rashid | ................... | H02P 9/302 322/25 |
| 6,298,448 B1 * | 10/2001 | Shaffer | ................ | G06F 1/3203 713/322 |
| 2012/0319504 A1 * | 12/2012 | Malmberg | ............... | H02J 1/08 307/151 |
| 2013/0024707 A1 * | 1/2013 | Miwa | .................... | G06F 1/3225 713/322 |

OTHER PUBLICATIONS

Efraim, Rotem, et al., "Energy Aware Race to Halt: A Down to EARtH Approach for Platform Energy Management," (IEEE & CSDL, Oct. 5, 2012, DOI 10.1109/L-CA.2012.32), 4 pages.

* cited by examiner

*Primary Examiner* — Paul Yen
(74) *Attorney, Agent, or Firm* — Patent Capital Group (57) ABSTRACT

A first optimal CPU frequency that produces minimal power consumption for a CPU/platform combination may be calculated by using an Efficiency Aware Race to Halt (EARtH) algorithm, which ignores the power efficiency curve of the voltage regulator (VR). These results may then be modified by applying the power efficiency curve of the associated VR to determine a second optimal CPU frequency that produces power consumption that is less than the value calculated by the EARtH algorithm.

22 Claims, 3 Drawing Sheets

VOLTAGE REGULATOR EFFICIENCY-AWARE SYSTEM ENERGY MANAGEMENT

TECHNICAL FIELD

Various embodiments of the invention may pertain to trying to obtain optimal power efficiency in a computer system.

BACKGROUND

When trying to optimize (i.e., minimize) energy consumption in a computer system, various approaches may be used. Some such approaches consider the higher CPU energy consumption resulting from a faster clock frequency vs. the lower platform energy consumption resulting from finishing the task in less time with that faster clock frequency ("Race to Halt"). A particular algorithm involving this approach, called EARtH, was described by Rotem Efraim et al. in a paper titled "Energy Aware Race to Halt: A Down to Earth Approach for Platform Energy Management" (IEEE & CSDL, Oct. 5, 2012, DOI 10.1109/L-CA.2012.32). However, the EARtH algorithm doesn't account for the power efficiency of the voltage regulator, which may vary with factors such as load conditions, operating voltage etc. Hence, the power-optimized frequency determined by the EARtH algorithm may not produce the actual power-optimized frequency because the EARtH algorithm ignores the interactive effects of the voltage regulator.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 1:
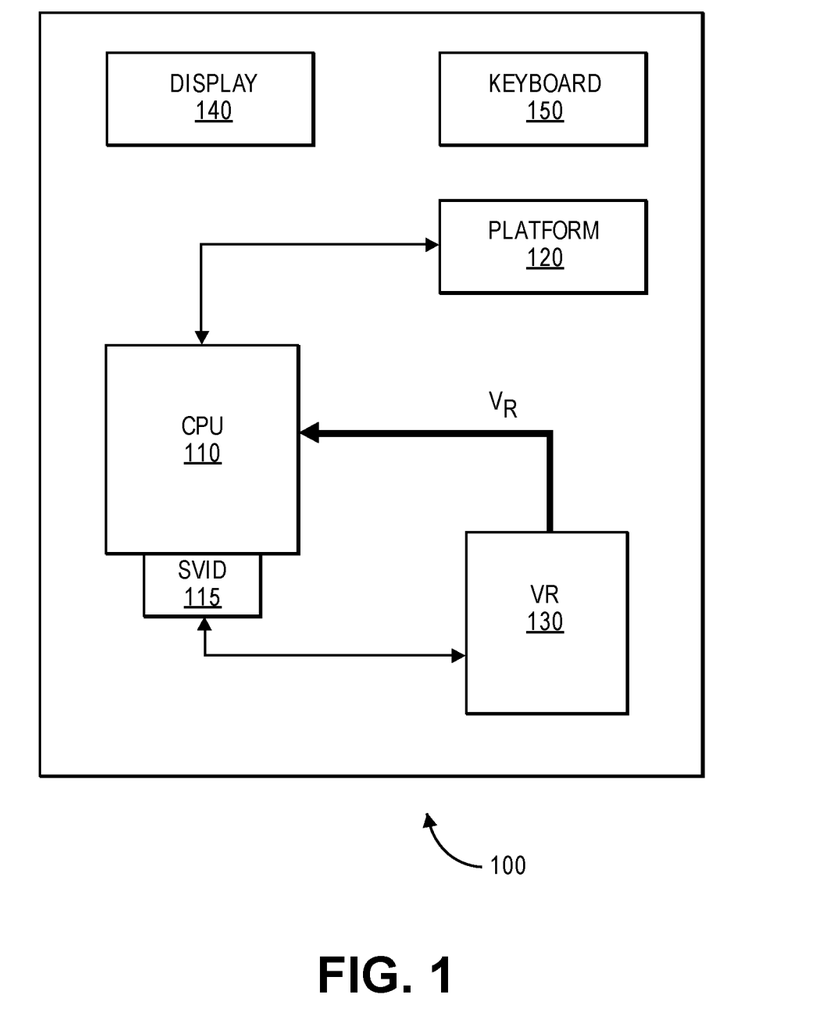
FIG. 1 shows a computer system, according to an embodiment of the invention.

FIG. 1 shows a computer system, according to an embodiment of the invention. In the illustrated embodiment, CPU 110 is coupled to platform 120, where it can both send and receive signals through that coupling. CPU 110 is also coupled to voltage regulator (VR) 130 through SVID interface 115, where it can both send and receive signals through that interface. In return, the VR may provide operating voltage $V_R$ to the CPU. Although the platform and VR are shown separately, the VR may be mounted on the platform and be considered part of the platform, even though it is typical for VR's to be manufactured by, and purchased from, a different vendor than the rest of the system.

FIG. 1 also shows additional components of system 100, such as a display 140 and a keyboard 150. Other components not shown may also be included. In addition, things such as cache memory, voltage controlled oscillators, interfaces, etc., may be in the same integrated circuit as the CPU or in the platform.

As related to FIG. 1, power consumption in a computer system can be divided into two parts: 1) CPU power, which is the power consumed by the CPU, and 2) platform power, which is the power consumed by the components associated with the CPU but not part of the CPU, including the VR.

Reducing overall power consumption should consider both of these contributing factors. An algorithm called Energy Aware Race to Halt (EARtH) was previously developed that considered these two factors (CPU and platform power) in terms of the clock frequency employed in the circuitry, and attempted to find an optimal frequency to achieve minimum power consumption for these two elements.

Figure 2:
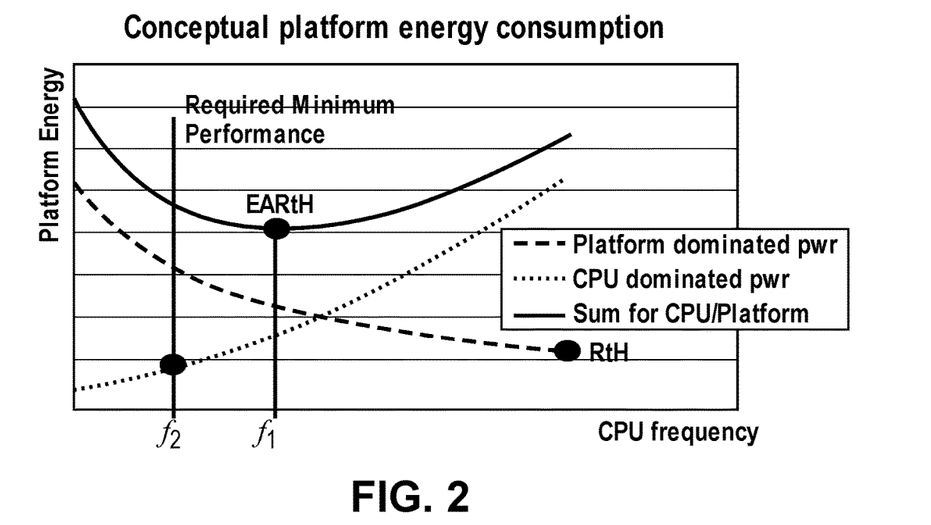
FIG. 2 shows an example of EARtH-based chart of energy consumption in a computer system, according to an embodiment of the invention.

FIG. 2 shows an EARtH-based chart of energy consumption in a computer system, according to an embodiment of the invention. The EARtH algorithm makes two assumptions: 1) power consumption by the CPU goes up as clock frequency increases, due to the nature of state transition-based power consumption by the individual transistors in the CPU circuitry, and 2) if the platform follows a race-to-halt approach, in which some of the platform circuitry is stopped or moved to a low-power state after completion of the current task, then power consumption by the platform will go down as clock frequency increases, because the task will be completed more quickly. The EARtH algorithm is intended to balance these two opposing effects against each other to find the optimal frequency that will result in the lowest energy consumption by the combined CPU and platform.

FIG. 2 illustrates this principle. In the figure, the dotted line shows CPU power consumption, which goes up with frequency. The dashed line shows platform power consumption, which goes down with frequency under the Race-to-Halt approach. The solid line shows the system power consumption as the sum of the CPU power and the platform power. In this particular example, the point on the solid line labeled EARtH shows the point at which minimum calculated system energy consumption may occur, corresponding to optimal frequency $f_1$ for this combination. This figure also shows a minimum frequency $f_2$ for minimum required performance, indicating that any frequency below this point would produce unacceptable performance levels, regardless of power consumption. When implemented, this limitation may place a lower limit on the EARtH frequency.

Curves for CPU power and platform power may be determined in various ways. In one embodiment, various tasks may be run at various frequencies, while power consumption may be measured at each frequency. Power consumption may be measured separately for the CPU and the platform, and recorded for each frequency. The terms 'CPU dominated' and 'platform dominated' are used in FIG. 2 to acknowledge that all such operations to establish the curves may cause some power to be consumed by both the CPU and the platform, and the components of this shared power consumption may not be distinguishable from each other. But operations are known that produce power consumption that occurs predominately in the CPU, and other operations are known that produce power consumption that occurs predominately in the platform. These operations may be used to produce the power consumption measurements for the CPU and the platform at each selected frequency.

Since only values for the selected frequencies can be determined in this process, the frequency producing the smallest total power consumption for the combined CPU and platform curves may be chosen as the optimal frequency, and it may be a near-optimal rather than a truly optimal frequency. However, for the purposes of this document, the terms 'optimal frequency' and 'near-optimal frequency' shall be synonymous and either may be used to describe the frequency chosen by the processes described herein, even if a different process might produce even smaller total power consumption.

As mentioned earlier, although the EARtH algorithm may produce a calculated near-optimal frequency to hopefully minimize the combined power consumption of the CPU and platform, it does not consider the power consumption characteristics of the VR. In general, power efficiency in the VR is dependent on its load, and the load on the VR created by the CPU increases with increasing frequency. This can create a power consumption slope for the VR that varies with the frequency used by the CPU.

Obtaining the power consumption slope of the VR may be accomplished in various ways. In one embodiment, the characteristics of this slope may be determined by the VR manufacturer and stored in the VR, where it can later be read and stored by the CPU. In another embodiment, the VR may be able to calculate its own power slope under different load conditions while in the system, and provide the values of the resulting slope to the CPU. In still another embodiment, the CPU may choose a series of frequencies, and request the VR to measure and report its power consumption as the CPU operates at each of those frequencies. Other methods may also be used.

Figure 3:
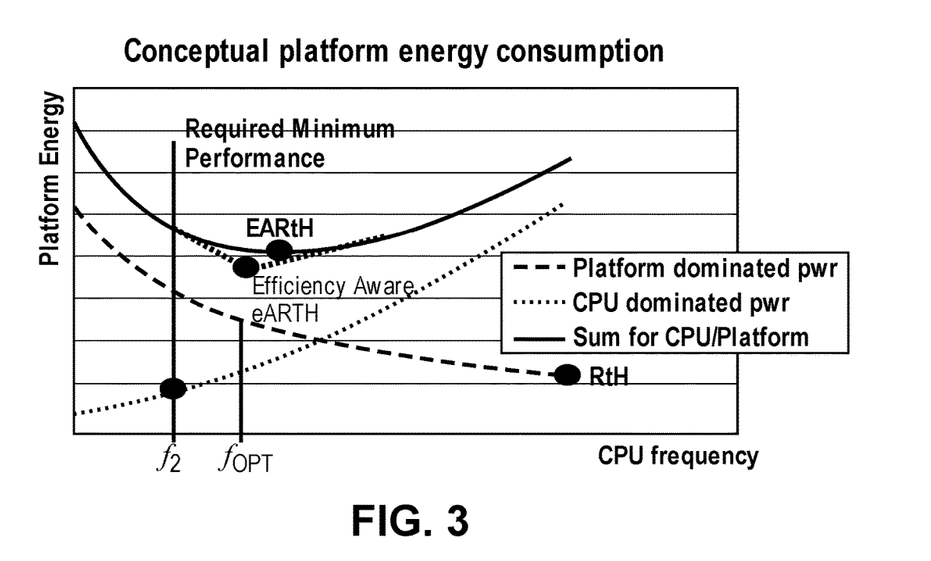
FIG. 3 shows an example of a VR efficiency aware EARtH-based chart of energy consumption in a computer system, according to an embodiment of the invention.

FIG. 3 shows a Voltage Regulator Efficiency Aware Race to Halt (VR EARtH)-based chart of energy consumption in a computer system, according to an embodiment of the invention. This chart looks similar to the chart of FIG. 2, but the sum of CPU and platform powers has been modified near the EARtH point by factoring in the VR power curve. The optimal point in this chart is labeled Efficiency Aware eARTH, to distinguish it from the EARtH point of FIG. 2, and the corresponding frequency has been labeled $f_{OPT}$.

The VR efficiency curve may be applied to the balanced CPU/Platform curve in various ways. In one embodiment, the CPU may determine its own power load at the EARtH frequency, and at several selected frequencies on either side of the EARtH frequency. The CPU may then request the VR to send the VR power consumption values for each of those loads. The CPU can then add the VR power consumption to the EARtH-determined power consumption at each of the selected frequencies to determine the frequency resulting in the lowest total power consumption. Alternately, the CPU may also look at power consumption when it varies VR load points and the frequency associated with the lowest power consumption. Regardless of the method used, the frequency determined by this process may then be stored as $f_{OPT}$ and used for system operation. Although $f_{OPT}$ may be equal to $f_1$, it should not be greater than $f_1$.

Since a load-based power consumption curve for the VR may remain relatively unchanged for a specific VR, in some embodiments the curve may be stored by the manufacturer. In another embodiment, the curve may be determined and stored prior to run time, such as, for example, during execution of the BIOS.

In some embodiments, a predetermined optimal frequency $f_{OPT}$ may be determined before run time for every expected task, so that no calculations or measurements need be taken during system operation.

Although it might be possible to determine an $f_{OPT}$ for every task, this may be too burdensome to implement for all tasks. In such cases, for some of the tasks $f_{OPT}$ may simply default to a predetermined frequency.

Figure 4:
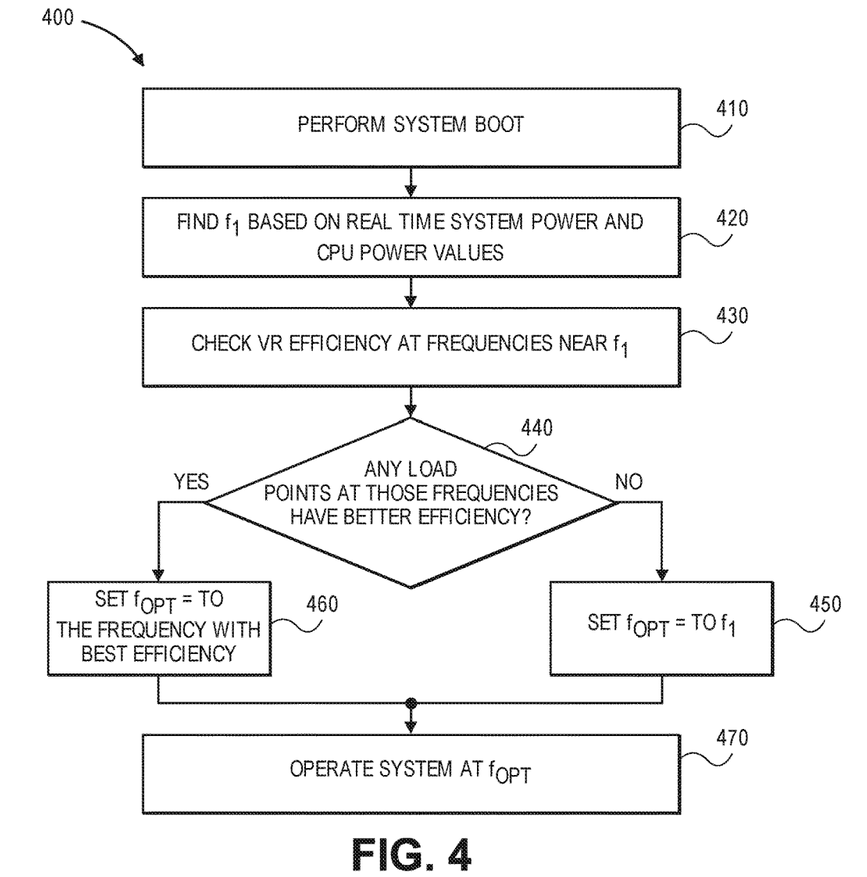
FIG. 4 shows a flow diagram of a method, according to an embodiment of the invention.

FIG. 4 shows a flow diagram of a method, according to an embodiment of the invention. In flow diagram 400, at 410 the system may perform a system boot. At 420, using the EARtH algorithm or its equivalent, an optimal frequency $f_1$ may be determined for minimal CPU and platform power consumption, while ignoring the effect of the VR efficiency curve. At 430, VR efficiency at frequencies near $f_1$ may be determined. At 440, it may be determined whether any of the VR load points corresponding to those frequencies produces better efficiency than was experienced at $f_1$. If none of the load points/frequencies produces better efficiency than $f_1$, then $f_{OPT}$ may be set equal to $f_1$ at 450.

If one or more of the load points/frequencies that was considered at 430 produces better efficiency than $f_1$, then $f_{OPT}$ may be set equal to the frequency associated with the best efficiency at 460. The process at 430 and 440 may be performed in various ways. For example, in one embodiment frequencies adjacent to $f_1$ on either side may be considered, then frequencies adjacent to them may be considered, etc., until efficiency starts decreasing rather than increasing. Further examination of additional frequencies may then stop, and the frequency producing the best efficiency used. Regardless of when $f_{OPT}$ or any of the values that produce it are determined, any or all of those values may be stored for further use. Regardless of how $f_{OPT}$ was determined, the system may be operated at that frequency at 470.

Figure 5:
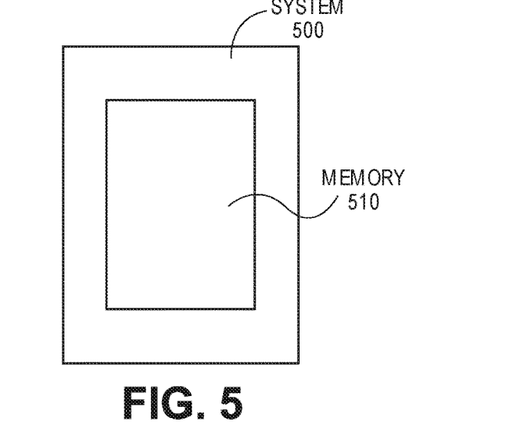
FIG. 5 shows a computer-readable memory containing instructions, according to an embodiment of the invention.

FIG. 5 shows a computer-readable memory containing instructions, according to an embodiment of the invention. Memory 510 may comprise one or more separate tangible storage mediums, which contain instructions that may be executed to perform operations described here. This medium may be contained within a larger system 500. Paragraph [0008] of this document contains further details on this medium.

EXAMPLES

The following examples pertain to particular embodiments:

Example 1 includes a method of operating a computer system, comprising:
  determining a first frequency of operation for the CPU which produces a first power consumption value for a combination of the CPU and the platform for a particular task, wherein the first power consumption value represents a minimum power determined using an Efficiency Aware Race to Halt (EARtH) algorithm;
  determining a second frequency of operation for the CPU which produces a second power consumption value for a combination of the CPU, platform, and VR for the particular task, wherein the second power consumption value represents a minimum power determined using the EARtH algorithm as modified to consider efficiency of the VR; and
  operating the CPU at the second frequency for the particular task;
  wherein the second power consumption is not greater than the first minimum power consumption.

Example 2 includes the method of example 1, further comprising operating multiple tasks, each task to be associated with the separate first frequency and separate second frequency.

Example 3 includes the method of example 1, wherein said determining the first frequency comprises an operation selected from a list of operations consisting of:
  a) reading the first frequency from a table of frequencies linking each of those frequencies with corresponding tasks; or
  b) executing the task at multiple frequencies and storing a one of the multiple frequencies that results in minimum power consumption for the task.

Example 4 includes the method of example 3, wherein said storing comprises storing in the CPU.

Example 5 includes the method of example 1, wherein said determining the second frequency comprises an operation selected from a list of operations consisting of:
  a) reading power consumption values for the VR for each of multiple loads;
  b) reading power consumption values for the VR for each of multiple frequencies.

Example 6 includes the method of example 3, wherein said storing comprises storing in the VR.

Example 7 includes a computer-readable non-transitory storage medium that contains instructions, which when executed by one or more processors result in performing operations comprising:
  determining a first frequency of operation for the CPU which produces a first power consumption value for a combination of the CPU and the platform for a particular task, wherein the first power consumption value represents a minimum power determined using an Efficiency Aware Race to Halt (EARtH) algorithm;
  determining a second frequency of operation for the CPU which produces a second power consumption value for a combination of the CPU, platform, and VR for the particular task, wherein the second power consumption value represents a minimum power determined using the EARtH algorithm as modified to consider efficiency of the VR; and
  operating the CPU at the second frequency for the particular task;
  wherein the second power consumption is not greater than the first minimum power consumption.

Example 8 includes the medium of example 7, further comprising operating multiple tasks, each task to be associated with a separate first frequency and a separate second frequency.

Example 9 includes the medium of example 7, wherein said determining the first frequency comprises an operation selected from a list of operations consisting of:
  a) reading the first frequency from a table of frequencies linking each of those frequencies with corresponding tasks; or
  b) executing the task at multiple frequencies and storing a one of the multiple frequencies that results in minimum power consumption for the task.

Example 10 includes the medium of example 9, wherein said storing comprises storing in the CPU.

Example 11 includes the medium of example 7, wherein said determining the second frequency comprises an operation selected from a list of operations consisting of:
  a) reading power consumption values for the VR for each of multiple loads;
  b) reading power consumption values for the VR for each of multiple frequencies.

Example 12 includes the medium of example 9, wherein said storing comprises storing in the VR.

Example 13 includes a computer device comprising a CPU, a platform, and a voltage regulator (VR), the device adapted to:
  determining a first frequency of operation for the CPU which produces a first power consumption value for a combination of the CPU and the platform for a particular task, wherein the first power consumption value represents a minimum power determined using an Efficiency Aware Race to Halt (EARtH) algorithm;
  determining a second frequency of operation for the CPU which produces a second power consumption value for a combination of the CPU, platform, and VR for the particular task, wherein the second power consumption value represents a minimum power determined using the EARtH algorithm as modified to consider efficiency of the VR; and operating the CPU at the second frequency for the particular task;

wherein the second power consumption is not greater than the first minimum power consumption.

Example 14 includes the computer device of example 13, wherein the device is to operate multiple tasks, and each task is to be associated with separate values for the first frequency and the second frequency.

Example 15 includes the computer device of example 13, wherein said determining the first frequency comprises an operation selected from a list of operations consisting of:
 a) reading the first frequency from a table of frequencies linking each of those frequencies with corresponding tasks; or
 b) executing the task at multiple frequencies and storing a one of the multiple frequencies that results in minimum power consumption for the task.

Example 16 includes the computer device of example 15, wherein said storing comprises storing in the CPU.

Example 17 includes the computer device of example 13, wherein said determining the second frequency comprises an operation selected from a list of operations consisting of:
 a) reading power consumption values for the VR for each of multiple loads; or
 b) reading power consumption values for the VR for each of multiple frequencies.

Example 18 includes the computer device of example 15 wherein said storing comprises storing in the VR.

Example 19 includes the computer device of example 13, further including a display.

Example 20 includes the computer device of example 13, further including a keyboard.

Example 21 includes a computer device comprising a CPU, a platform, and a voltage regulator (VR), the device comprising means for:
 determining a first frequency of operation for the CPU which produces a first minimum power consumption for a combination of the CPU and the platform for a particular task, using an Efficiency Aware Race to Halt (EARtH) algorithm that excludes values for efficiency of the VR;
 determining a second frequency of operation for the CPU which produces a second minimum power consumption for a combination of the CPU and the platform for the particular task, using the EARtH algorithm modified to consider the values for efficiency of the VR; and
 operating the CPU at the second frequency for the particular task;
 wherein the second minimum power consumption is not greater than the first minimum power consumption.

Example 22 includes the computer device of example 21, the device further comprising means for operating multiple tasks, wherein each task is to be associated with separate values for the first frequency and the second frequency.

Example 23 includes the computer device of example 21, the device further comprising means for said determining the first frequency by:
 a) reading the first frequency from a table of frequencies linking each of those frequencies with corresponding tasks; or
 b) executing the task at multiple frequencies and storing a one of the multiple frequencies that results in minimum power consumption for the task.

Example 24 includes the computer device of example 23, the device further comprising means for storing the one of the multiple frequencies in the CPU.

Example 25 includes the computer device of example 21, the device further comprising means for said determining the second frequency by performing an operation selected from a list of operations consisting of:
 a) reading power consumption values for the VR for each of multiple loads;
 b) reading power consumption values for the VR for each of multiple frequencies.

Example 26 includes the computer device of example 23, the device further comprising means for storing the power consumption values in the VR.

Example 27 includes a method of operating a computer system, comprising:
 determining a first frequency that produces a first minimum power consumption for a system on a chip (SOC), using an Efficiency Aware Race to Halt (EARtH) algorithm that excludes values for efficiency of a voltage regulator (VR);
 determining efficiency of the voltage regulator (VR) at each of multiple frequencies that are near the first frequency;
 choosing a second frequency from among the multiple frequencies, wherein the second frequency produces a second minimum power consumption for the SOC using the EARtH algorithm modified to include values for the efficiency of the VR at each of the multiple frequencies; and
 operating the CPU at the second frequency for the particular task;
 wherein the second minimum power consumption is not greater than the first minimum power consumption.

Example 28 includes the method of example 27, wherein said choosing the second frequency comprises:
 determining a third frequency above the first frequency;
 determining a fourth frequency below the first frequency;
 setting the second frequency equal to whichever one of the first, third, and fourth frequencies produces the second minimum power consumption.

Example 29 includes a computer-readable non-transitory storage medium that contains instructions, which when executed by one or more processors result in performing operations comprising:
 determining a first frequency that produces a first minimum power consumption for a system on a chip (SOC), using an Efficiency Aware Race to Halt (EARtH) algorithm that excludes values for efficiency of a voltage regulator (VR);
 determining efficiency of the voltage regulator (VR) at each of multiple frequencies that are near the first frequency;
 choosing a second frequency from among the multiple frequencies, wherein the second frequency produces a second minimum power consumption for the SOC using the EARtH algorithm modified to include values for the efficiency of the VR at each of the multiple frequencies; and
 operating the CPU at the second frequency for the particular task;
 wherein the second minimum power consumption is not greater than the first minimum power consumption.

Example 30 includes the medium of example 29, wherein said choosing the second frequency comprises:
 determining a third frequency above the first frequency;
 determining a fourth frequency below the first frequency;
 setting the second frequency equal to whichever one of the first, third, and fourth frequencies produces the second minimum power consumption.

Example 31 includes a computer device comprising a CPU, a platform, and a voltage regulator (VR), the device adapted to:

determine a first frequency that produces a first minimum power consumption for a system on a chip (SOC), using an Efficiency Aware Race to Halt (EARtH) algorithm that excludes values for efficiency of a voltage regulator (VR);

determine efficiency of the voltage regulator (VR) at each of multiple frequencies that are near the first frequency;

choose a second frequency from among the multiple frequencies, wherein the second frequency produces a second minimum power consumption for the SOC using the EARtH algorithm modified to include values for the efficiency of the VR at each of the multiple frequencies; and operate the CPU at the second frequency for the particular task;

wherein the second minimum power consumption is not greater than the first minimum power consumption.

Example 32 includes the device of example 31, wherein said choosing the second frequency comprises:

determining a third frequency above the first frequency;
determining a fourth frequency below the first frequency;
setting the second frequency equal to whichever one of the first, third, and fourth frequencies produces the second minimum power consumption.

Example 33 includes a computer device comprising means to:

determine a first frequency that produces a first minimum power consumption for a system on a chip (SOC), using an Efficiency Aware Race to Halt (EARtH) algorithm that excludes values for efficiency of a voltage regulator (VR);

determine efficiency of the voltage regulator (VR) at each of multiple frequencies that are near the first frequency;

choose a second frequency from among the multiple frequencies, wherein the second frequency produces a second minimum power consumption for the SOC using the EARtH algorithm modified to include values for the efficiency of the VR at each of the multiple frequencies; and operate the CPU at the second frequency for the particular task;

wherein the second minimum power consumption is not greater than the first minimum power consumption.

Example 34 includes the device of example 33, wherein said choosing the second frequency comprises means to:

determine a third frequency above the first frequency;
determine a fourth frequency below the first frequency;
set the second frequency equal to whichever one of the first, third, and fourth frequencies produces the second minimum power consumption.

The foregoing description is intended to be illustrative and not limiting. Variations will occur to those of skill in the art. Those variations are intended to be included in the various embodiments of the invention, which are limited only by the scope of the following claims.

What is claimed is:

1. A computer device comprising a CPU, a platform, and a voltage regulator (VR), the device adapted to:

determine a first frequency of operation for the CPU which produces a first power consumption value for a combination of the CPU and the platform, but excluding the VR, for a particular task, wherein the first power consumption value represents a minimum power determined using an Efficiency Aware Race to Halt (EARtH) algorithm;

determine a second frequency of operation for the CPU which produces a second power consumption value for a combination of the CPU, platform, and VR for the particular task, wherein the second power consumption value represents a minimum power determined using the EARtH algorithm as modified to consider frequency-based efficiency of the VR; and operate the CPU at the second frequency for the particular task;

wherein the second power consumption value is not greater than the first power consumption value.

2. The computer device of claim 1, wherein the device is to operate multiple tasks, and each task is to be associated with separate values for the first frequency and the second frequency.

3. The computer device of claim 1, wherein said determining the first frequency comprises an operation selected from a list of operations consisting of:

a) reading the first frequency from a table of frequencies linking each of those frequencies with corresponding tasks; or b) executing the task at multiple frequencies and storing a one of the multiple frequencies that results in minimum power consumption for the task.

4. The computer device of claim 3, wherein said storing comprises storing in the CPU.

5. The computer device of claim 1, wherein said determining the second frequency comprises an operation selected from a list of operations consisting of:

a) reading power consumption values for the VR for each of multiple loads; or b) reading power consumption values for the VR for each of multiple frequencies.

6. The computer device of claim 3, wherein said storing comprises storing in the VR.

7. The computer device of claim 1, further including a display.

8. The computer device of claim 1, further including a keyboard.

9. A computer-readable non-transitory storage medium that contains instructions, which, when executed by one or more processors of a computer device including a CPU, a platform, and a voltage regulator (VR), result in performing operations comprising:

determining a first frequency of operation for the CPU which produces a first power consumption value for a combination of the CPU and the platform, but excluding the VR, for a particular task, wherein the first power consumption value represents a minimum power determined using an Efficiency Aware Race to Halt (EARtH) algorithm;

determining a second frequency of operation for the CPU which produces a second power consumption value for a combination of the CPU, platform, and VR for the particular task, wherein the second power consumption value represents a minimum power determined using the EARtH algorithm as modified to consider frequency-based efficiency of the VR; and operating the CPU at the second frequency for the particular task;

wherein the second power consumption value is not greater than the first power consumption value.

10. The medium of claim 9, the operations further comprising operating multiple tasks, each task to be associated with a separate first frequency and a separate second frequency.

11. The medium of claim 9, wherein said determining the first frequency comprises an operation selected from a list of operations consisting of:

a) reading the first frequency from a table of frequencies linking each of those frequencies with corresponding tasks; or b) executing the task at multiple frequencies and storing a one of the multiple frequencies that results in minimum power consumption for the task.

12. The medium of claim 11, wherein said storing comprises storing in the CPU.

13. The medium of claim 9, wherein said determining the second frequency comprises an operation selected from a list of operations consisting of:
   a) reading power consumption values for the VR for each of multiple loads; or
   b) reading power consumption values for the VR for each of multiple frequencies.

14. The medium of claim 11, wherein said storing comprises storing in the VR.

15. A method of operating a computer system including a CPU, a platform, and a voltage regulator (VR), comprising:
   determining a first frequency of operation for the CPU which produces a first power consumption value for a combination of the CPU and the platform, but excluding the VR, for a particular task, wherein the first power consumption value represents a minimum power determined using an Efficiency Aware Race to Halt (EARtH) algorithm;
   determining a second frequency of operation for the CPU which produces a second power consumption value for a combination of the CPU, platform, and VR for the particular task, wherein the second power consumption value represents a minimum power determined using the EARtH algorithm as modified to consider efficiency of the VR; and
   operating the CPU at the second frequency for the particular task;
   wherein the second power consumption value is not greater than the first power consumption value.

16. The method of claim 15, further comprising operating multiple tasks, each task to be associated with the separate first frequency and separate second frequency.

17. The method of claim 15, wherein said determining the first frequency comprises an operation selected from a list of operations consisting of:
   a) reading the first frequency from a table of frequencies linking each of those frequencies with corresponding tasks; or
   b) executing the task at multiple frequencies and storing a one of the multiple frequencies that results in minimum power consumption for the task.

18. The method of claim 17, wherein said storing comprises storing in the CPU.

19. The method of claim 17, wherein said determining the second frequency comprises an operation selected from a list of operations consisting of:
   a) reading power consumption values for the VR for each of multiple loads; or
   b) reading power consumption values for the VR for each of multiple frequencies.

20. The method of claim 16, wherein said storing comprises storing in the VR.

21. A system on a chip (SOC) comprising a CPU, a platform, and a voltage regulator (VR), the SOC adapted to:
   determine a first frequency that produces a first minimum power consumption for the SOC, using an Efficiency Aware Race to Halt (EARtH) algorithm that excludes values for efficiency of the voltage regulator (VR);
   determine efficiency of the voltage regulator (VR) at each of multiple frequencies that are not the first frequency;
   choose a second frequency from among the multiple frequencies, wherein the second frequency produces a second minimum power consumption for the SOC using the EARtH algorithm modified to include values for the efficiency of the VR at each of the multiple frequencies; and
   operate the CPU at the second frequency for the particular task;
   wherein the second power consumption is not greater than the first power consumption value.

22. The SOC claim 21, wherein said choosing the second frequency comprises:
   determining a third frequency above the first frequency;
   determining a fourth frequency below the first frequency; and
   setting the second frequency equal to whichever one of the first, third, and fourth frequencies produces the second minimum power consumption.

* * * * *

UNITED STATES PATENT AND TRADEMARK OFFICE
CERTIFICATE OF CORRECTION

PATENT NO. : 10,551,900 B2
APPLICATION NO. : 15/471606
DATED : February 4, 2020
INVENTOR(S) : Vijayakumar A. Dibbad et al.

It is certified that error appears in the above-identified patent and that said Letters Patent is hereby corrected as shown below:

In the Claims

In Column 9, Line 55, in Claim 1, delete "(VR),the" and insert -- (VR), the --, therefor.

In Column 12, Line 31, in Claim 21, after "consumption" insert -- value --.

In Column 12, Line 3, in Claim 22, after "SOC" insert -- of --.

Signed and Sealed this
Seventeenth Day of March, 2020

Andrei Iancu
*Director of the United States Patent and Trademark Office*